Dec. 24, 1963   R. H. HOLLIDAY   3,115,131
MICROWAVE ABSORPTION MEASUREMENT
Filed Oct. 16, 1961   2 Sheets-Sheet 1

INVENTOR.
REUBEN H. HOLLIDAY
BY Wade Looney
Sherman H. Goldman
ATTORNEYS

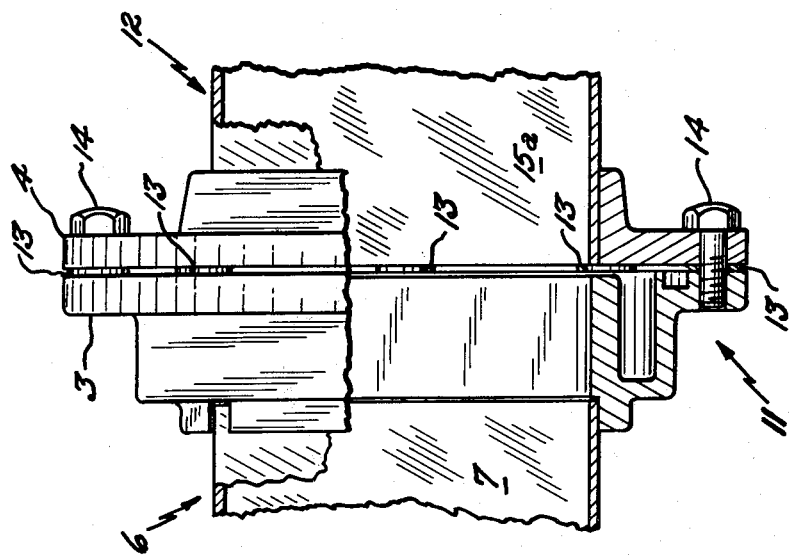
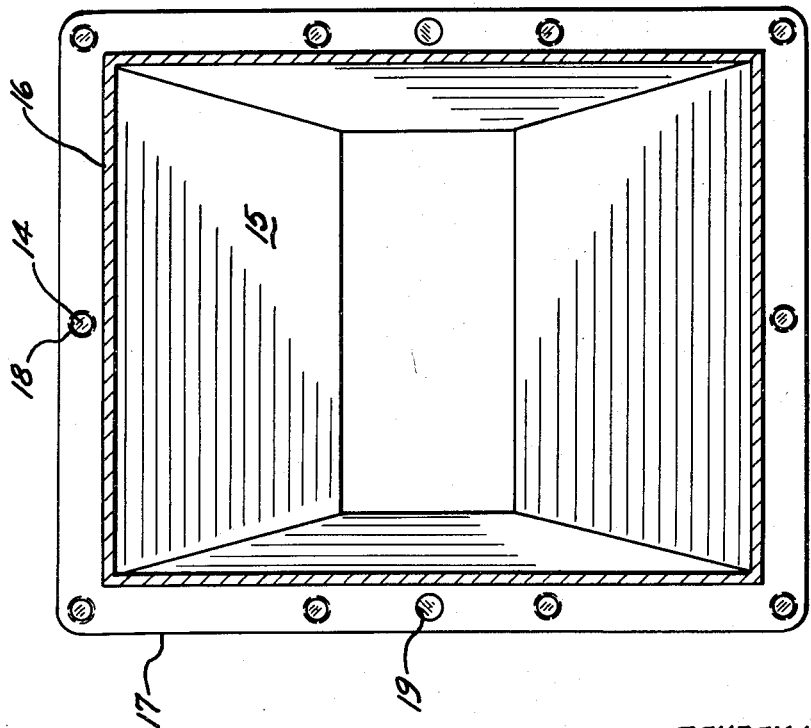

United States Patent Office 3,115,131
Patented Dec. 24, 1963

3,115,131
MICROWAVE ABSORPTION MEASUREMENT
Reuben H. Holliday, 1009 Westbrook Drive, Rome, N.Y.
Filed Oct. 16, 1961, Ser. No. 145,520
9 Claims. (Cl. 128—2)
(Granted under Title 35, U.S. Code (1952), sec. 266)

The invention described herein may be manufactured and used by or for the United States Government for governmental purposes without payment to me of any royalty thereon.

This invention relates to means for measuring microwave power absorbed by rabbits or other small animals when exposed to electromagnetic radiation in the microwave region.

Studies of the effects of microwave radiation on the health of human beings are being carried on by experimenting with animals in order that the effects may be extrapolated to human effects and thus aid in the designing of adequate countermeasures. The device of this invention is a biological research tool which is capable of accurately determining the amount of power absorbed by an animal.

Heretofore, experiments to determine the amount of power absorbed by an animal have been conducted by subjecting the animal to microwave power of a measured intensity. It was known that a certain amount of power was reflected back toward the source, and a certain amount passed by and through the animal; however, the amount of the reflected and passed power was not known. Efforts to account for the unknown power levels were attempted by trying to measure the temperature rise of the animal's body and then calculate the absorbed power or energy. These efforts were unsuccessful because of the adverse effects of microwave radiation on the temperature measuring apparatus. Since rabbits are usually the animal on which the measurements are taken, devices of this nature are usually known as rabbitometers.

Accomplishment of the desired result is achieved in this invention by providing a bidirectional coupler in order to measure incident and reflected power, an animal housing to contain the animal under observation, at least one choke joint which permits an inflow of air for the animal's respiration, a matched terminating waveguide section to absorb power passing through and around the animal, a directional coupler to measure this power, and a microwave power source and meters to operate the device.

Accordingly, it is an object of this invention to provide a means for measuring microwave power absorbed by animals subject to electromagnetic radiation.

It is another object of this invention to provide a biological research tool utilizable for determining the effects of microwave radiation on the health of human beings in order that adequate countermeasures may be determined and effected.

It is still another object of this invention to provide an accurate measuring device of power absorbed by animals.

It is a further object of this invention to provide a device for accurate measurement of reflected and passed power in a rabbitometer.

It is a still further object of this invention to eliminate the use of temperature measurement for determining absorbed microwave power in an animal.

Another object of this invention involves the elimination of complicated calculations to determine microwave power absorbed in an animal.

Still another object of this invention involves the production of a rabbitometer which is easy and economical to manufacture of commercial, currently available materials that lend themselves to standard mass production manufacturing techniques.

These and other advantages and features of my invention will become apparent upon consideration of the following detailed description of one embodiment thereof, especially when taken in conjunction with the accompanying drawings, in which:

FIGURE 3 is a cross section along line III—III of FIGURE 1; and

FIGURE 4 is a view, partly in section of a choke joint.

In the drawings, like numerals are utilized to designate like parts.

Figure 1:
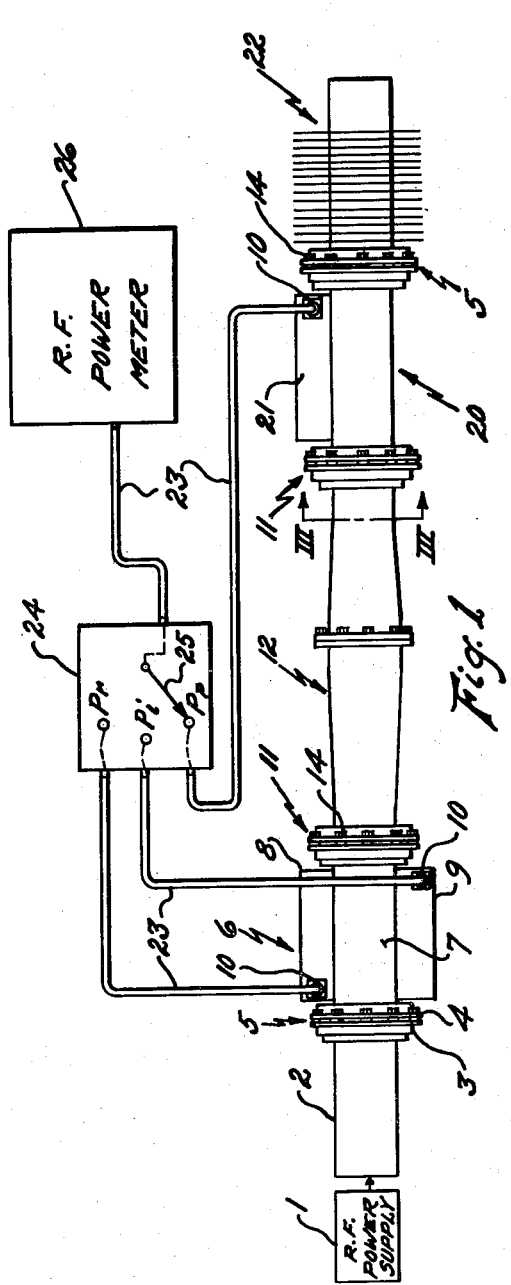
FIGURE 1 illustrates, partially schematically, the apparatus forming my invention.

Referring to FIGURE 1, the output from a microwave power source is presented to the input of the device which comprises a section of standard waveguide 2 to which a standard choke flange 3 has been attached. A commercial bidirectional coupler 6 for measuring incident power and reflected power, has a plain flange 4 to mate with choke flange 2 to complete a choke joint 5 at the junction of the input 1 and the bidirectional coupler 6. The bidirectional coupler comprises a center waveguide section 7 and a pair of R.F. receptacles 8 and 9 comprising a reverse coupling section and a forward coupling section, respectively. Each receptacle has a probe assembly 10 from which energy is to be measured. A ventilated choke joint 11 connects the bidirectional coupler 6 with the animal housing 12 and is shown partly in section in FIGURE 4. The standard choke flange 3 is attached to the coupler 6 while the plain flange 4 is attached to the animal housing 12. A series of spacer washers 13 are placed between the flanges 3 and 4 and are preferably silver soldered to the plain flange 4. Conventional securing means 14, equally spaced circumferentially around the flanges, hold them together. Thus, a space through which the animal is able to receive air for respiration is provided.

Figure 2:
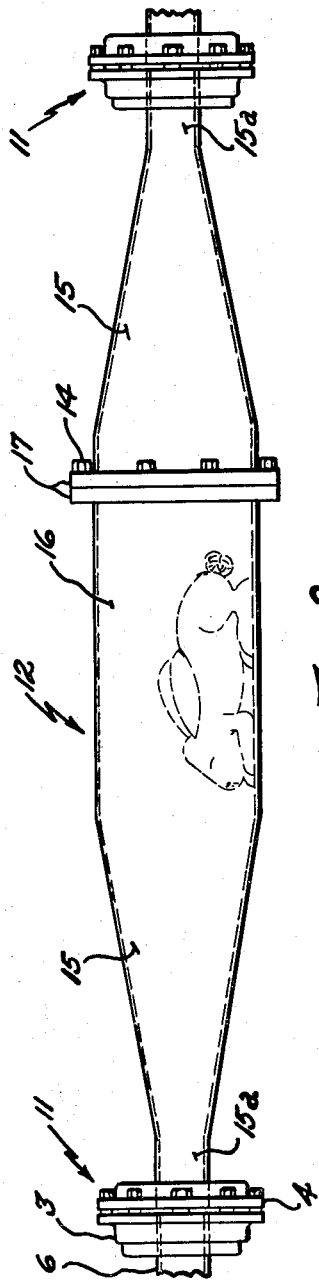
FIGURE 2 is a front view of the animal housing.

The animal housing 12, FIGURES 1, 2 and 3, when a standard waveguide would be too small for the animal under observation, comprises straight portions 15a for attachment to a choke joint and tapered sections 15 for optimum impedance match between the waveguide and a larger animal chamber portion 16 into which an anaesthetized animal is placed. A pair of mating flanges 17 allow for separation of the animal housing in order to provide for the insertion of the animal and contain tapped holes 18 in one flange 17 and a clearance hole for a securing bolt means 14 in the mating flange. A dowel means 19 to mate with a hole in the opposite flange is provided for alignment purposes. A ventilated choke joint 11 at the end of the housing 12 remote from the bidirectional coupler 6 is provided for animal respiration and couples the energy to a standard, commercial, directional coupler 20 with an R.F. receptacle 21 and probe assembly 10 for measurement of power passing through and around the animal. A matched terminating waveguide section 22 or dummy load is coupled to the directional coupler 20 by means of a choke joint 5 and absorbs all power received.

Since the incident power or the pulsed power from the source $P_i = P_a + (P_r + P_p)$, where $P_a$ is the power absorbed by the animal, $P_r$ is the reflected power, and $P_p$ is the power passing through and around the animal, the $P_a$ term may be determined by measuring the R.F. power from each probe assembly 10. Coaxial lines 23 connect each probe assembly 10 with a terminal on single pole, triple throw, coaxial switch 24 and the pole 25 of the switch with a standard R.F. power meter 26. Each position of the switch is labeled with the power to be measured from the R.F. receptacles. Of course the switch could be eliminated if separate meters were provided for each probe.

Elimination of the direct measurement of power passing through and around the animal may be effected to reduce the cost of the device by omitting the directional coupler 20, and one power meter if three meters in lieu of switch 24 are used. However, measurement of the standing wave ratios before and after inserting the animal, and then calculating the power absorbed by the animal as a function of the power applied and the standing wave ratios would be necessary. Calculations would be reduced and simplified by the use of calibration curves and charts.

Thus, it can be seen that a device suitable for determination of microwave power absorbed by an animal is presented which provides a valuable research tool to make up a missing link in a series of processes for ultimately determining the effects of microwave radiation on the health of human beings.

Although the invention has been described with reference to particular embodiments, it will be understood to those skilled in the art that the invention is capable of a variety of alternative embodiments. For example, for high frequency operation the choke flanges could be replaced with standard, precision flanges and ventilation provided by holes in waveguide section 16 which are small compared with the wavelength. Furthermore, separate crystal detectors could be used in place of the type N connectors shown at 10 for use with a conventional meter. I intend to be limited only by the spirit and scope of the appended claims.

I claim:

1. In a microwave power measuring system including a waveguide, the combination with said waveguide of means for measuring microwave power absorbed by a body housed in said waveguide, said means comprising a source of microwave power, means for directing said power to said waveguide, means connected between said source and that portion of said waveguide that precedes said body for measuring the input power and the power reflected by said body, and means connected with the post-body section of said waveguide for measuring the power passed through and by said body, the power absorbed by the body being the difference between the input power and the sum of the reflected power and power passed by and through the body.

2. A device as defined in claim 1 wherein said first mentioned measuring means comprises a bidirectional coupler.

3. A device as defined in claim 1 wherein said last mentioned measuring means comprises a directional coupler.

4. A device as defined in claim 1 including termination means for absorbing all power passing by and through said body.

5. A device as defined in claim 1 wherein said first mentioned means comprises a bidirectional coupler, and said last mentioned means comprises a directional coupler, an R.F. power meter means, and switch means for connecting each of said couplers to said R.F. power meter.

6. A device for measuring the microwave power absorbed by a living body comprising a source of R.F. power, a waveguide for forming a housing for said living body, means on said housing for providing ventilation for respiration of said body, means between said source and said housing for detecting the amount of input power and power reflected by said body, and means at the other end of said waveguide remote from said first-mentioned detecting means for detecting the amount of power passed by and through said body.

7. A device as defined in claim 6 wherein said housing comprises a separable enlarged portion of waveguide and tapered waveguide sections for impedance matching.

8. A device as defined in claim 6 wherein said ventilation means comprises a choke joint having spaced flange elements.

9. A device as defined in claim 6 including dummy load means for absorbing the power passed by and through the said body.

References Cited in the file of this patent
UNITED STATES PATENTS

| | | |
|---|---|---|
| 2,532,817 | Lafferty et al. | Dec. 5, 1950 |
| 2,611,804 | Zaleski | Sept. 23, 1952 |
| 2,798,197 | Thurston | July 2, 1957 |